United States Patent
Song et al.

(10) Patent No.: US 11,914,858 B1
(45) Date of Patent: Feb. 27, 2024

(54) WINDOW REPLACEMENT DISPLAY DEVICE AND CONTROL METHOD THEREOF

(71) Applicants: Helen Hyun-Min Song, Tai Hang (HK); Yunseo Jeon, Gyeonggi-do (KR)

(72) Inventors: Helen Hyun-Min Song, Tai Hang (HK); Yunseo Jeon, Gyeonggi-do (KR)

( * ) Notice: Subject to any disclaimer, the term of this patent is extended or adjusted under 35 U.S.C. 154(b) by 0 days.

(21) Appl. No.: 18/063,762

(22) Filed: Dec. 9, 2022

(51) Int. Cl.
*G06F 3/0488* (2022.01)
*G04G 9/00* (2006.01)
*G06F 3/01* (2006.01)
*G06F 3/0486* (2013.01)

(52) U.S. Cl.
CPC ........... *G06F 3/0488* (2013.01); *G04G 9/007* (2013.01); *G06F 3/011* (2013.01); *G06F 3/0486* (2013.01)

(58) Field of Classification Search
CPC ...... G06F 3/0488; G06F 3/011; G06F 3/0486; G04G 9/007
See application file for complete search history.

(56) References Cited

U.S. PATENT DOCUMENTS

| | | | | |
|---|---|---|---|---|
| 9,674,924 B2* | 6/2017 | Lashina | ............... | H05B 47/155 |
| 9,779,538 B2* | 10/2017 | Sanders | ............... | G06F 3/011 |
| 9,864,559 B2* | 1/2018 | Sizelove | ............... | G06F 3/14 |
| 10,452,934 B1* | 10/2019 | Brauer | ............... | G06F 3/1446 |
| 10,554,921 B1* | 2/2020 | Lim | ............... | G06T 7/50 |
| 11,100,695 B1* | 8/2021 | O'Hagan | ............... | G06T 13/40 |
| 11,675,443 B2* | 6/2023 | Wang | ............... | A63F 13/426 |
| | | | | 345/161 |
| 11,677,585 B2* | 6/2023 | Ponaka | ............... | H04L 12/4633 |
| | | | | 370/254 |
| 2010/0157063 A1* | 6/2010 | Basso | ............... | G09F 27/00 |
| | | | | 348/169 |
| 2011/0058113 A1* | 3/2011 | Threlkel | ............... | G09F 19/22 |
| | | | | 349/1 |
| 2014/0292206 A1* | 10/2014 | Lashina | ............... | H05B 47/155 |
| | | | | 315/149 |
| 2015/0077337 A1* | 3/2015 | Coto-Lopez | ............... | G06F 3/017 |
| | | | | 345/156 |
| 2015/0085061 A1* | 3/2015 | Sun | ............... | H04L 65/403 |
| | | | | 348/14.07 |
| 2015/0089394 A1* | 3/2015 | Chen | ............... | G06F 3/0481 |
| | | | | 715/753 |
| 2016/0325836 A1* | 11/2016 | Teo | ............... | B64D 47/08 |
| 2018/0059774 A1* | 3/2018 | Lee | ............... | G09G 5/10 |
| 2018/0190024 A1* | 7/2018 | Dugan | ............... | G06T 19/006 |
| 2018/0318602 A1* | 11/2018 | Ciccarelli | ............... | A61N 5/0618 |
| 2019/0149772 A1* | 5/2019 | Fernandes | ............... | G06F 3/0486 |
| | | | | 348/159 |
| 2019/0201806 A1* | 7/2019 | Weston | ............... | A63G 31/16 |
| 2019/0228244 A1* | 7/2019 | Brauer | ............... | G06F 3/013 |
| 2020/0035040 A1* | 1/2020 | Eschricht | ............... | G06F 3/012 |

(Continued)

FOREIGN PATENT DOCUMENTS

| | | | | | |
|---|---|---|---|---|---|
| KR | 2020009191 A | * | 1/2020 | ............... | C25B 1/04 |
| KR | 20220028321 | * | 8/2022 | | |

*Primary Examiner* — Benyam Ketema
(74) *Attorney, Agent, or Firm* — Finch & Maloney PLLC

(57) ABSTRACT

A window replacement display device having a memory that stores landscape information, a clock unit that generates current time information, a display unit for displaying the landscape information, and a control unit configured to change the landscape information according to the current time information and to display it on the display unit.

5 Claims, 5 Drawing Sheets

(56) References Cited

U.S. PATENT DOCUMENTS

| | | | | |
|---|---|---|---|---|
| 2020/0045234 | A1* | 2/2020 | Wei | H04N 23/698 |
| 2020/0252585 | A1* | 8/2020 | Zhou | H04N 23/695 |
| 2020/0307437 | A1* | 10/2020 | Thieberger | B62D 47/006 |
| 2021/0021800 | A1* | 1/2021 | Ragan | G06F 3/1446 |
| 2021/0052756 | A1* | 2/2021 | Kim | F21K 9/69 |
| 2021/0110608 | A1* | 4/2021 | Elby | G06T 19/006 |
| 2021/0373742 | A1* | 12/2021 | Basso | H04N 21/44218 |
| 2021/0374391 | A1* | 12/2021 | Jorasch | G06V 40/10 |
| 2022/0005398 | A1* | 1/2022 | Tsai | H04N 9/3138 |
| 2022/0051465 | A1* | 2/2022 | Braff | G06T 13/60 |
| 2022/0093034 | A1* | 3/2022 | Noh | H04N 5/262 |
| 2022/0164156 | A1* | 5/2022 | Fitzgerald | G06F 3/04842 |
| 2022/0191555 | A1* | 6/2022 | Vlassopulos | H04N 21/4122 |
| 2022/0207663 | A1* | 6/2022 | Carbonera Luvizon | G06T 7/13 |
| 2022/0207777 | A1* | 6/2022 | Van Der Zande | H04N 1/6083 |
| 2022/0239867 | A1* | 7/2022 | Shintani | G06V 40/161 |
| 2023/0120284 | A1* | 4/2023 | Kim | G06F 3/011 |
| | | | | 701/8 |
| 2023/0122434 | A1* | 4/2023 | Hoang | G06F 3/011 |
| | | | | 345/419 |
| 2023/0127303 | A1* | 4/2023 | Shahrokni | G06T 19/006 |
| | | | | 345/419 |

* cited by examiner

[Fig. 6]

WINDOW REPLACEMENT DISPLAY DEVICE AND CONTROL METHOD THEREOF

FIELD OF THE INVENTION

The present invention relates to a window replacement display device and a control method thereof.

BACKGROUND OF THE INVENTION

As people gather in big cities, housing prices in big cities are rising.

In particular, the gap between rich and poor is very wide in places such as Hong Kong and Shanghai. So poor people end up living in poor living conditions.

For example, there are many cases where people live in houses with no windows or houses underground.

In this case, people living in the house live in various bad environments.

First of all, it is very difficult to know the time because the sun is not shining. As a result, residents' living patterns often collapse. In addition, there are cases where mold is generated due to lack of ventilation and odor may occur.

Therefore, there is a need to improve this poor living environment.

SUMMARY OF THE INVENTION

The present invention is to provide a window replacement display device capable of improving a living environment and a control method thereof.

An embodiment of the present invention, which was devised to solve the above problems, is a window replacement display device comprising: a memory that stores landscape information; a clock unit that generates current time information; a display unit for displaying the landscape information; and a control unit configured to change the landscape information according to the current time information and to display it on the display unit.

According to one embodiment of the invention, the window replacement display device may further comprise a communication unit for receiving a weather information, wherein the control unit is configured to change the landscape information according to the weather information and to display it on the display unit.

According to one embodiment of the invention, wherein, the weather information includes sunrise information, sunset information, moonrise information, and moonset information, and the control unit is configured to control the brightness of the display unit according to the current time information.

According to one embodiment of the invention, wherein the weather information includes current weather information, and the control unit is configured to control to change and display the landscape information based on the weather information according to the current time information.

According to one embodiment of the invention, the window replacement display device may further comprise a human detection sensor, wherein the control unit is configured to turns off the display unit when a person is not detected through the human detection sensor.

According to one embodiment of the invention, the window replacement display device may further comprises a sterilizing light source, wherein the control unit is configured to turn on the sterilizing light source when a person is not detected through the human detection sensor, in order to improve the indoor atmospheric environment.

According to one embodiment of the invention, the window replacement display device may further comprise: a ventilation unit installed at both side of the display unit, wherein the control unit is configured to control the ventilation unit based on the weather information.

According to one embodiment of the invention, the display unit may be a touch screen, and the control unit is configured to control the ventilation unit to operate according to a touch input, and the touch input is a horizontal touch and drag input received through the touch screen, According to one embodiment of the invention, wherein the control unit may be configured to control the operation of the ventilation unit based on the distance of the touch and drag input.

Another embodiment of the invention is an operation control method of the display device for window replacement, the operation control method comprising: receiving a weather information through a communication unit; generating a time information through a clock unit; storing landscape information in a memory; and changing the landscape information according to the current time information and the weather information to display the changed landscape information on the display unit.

According to an embodiment of the present invention having the above-described configuration, a display device having the same function as a window is provided in a room without a window to help the emotional part of the resident as well as improve the indoor environment.

BRIEF DESCRIPTION OF THE DRAWINGS

FIG. 6 is a flowchart illustrating an operation of a display apparatus for replacing a window according to an embodiment of the present invention.

DETAILED DESCRIPTION OF THE PREFERRED EMBODIMENTS

Figure 1:
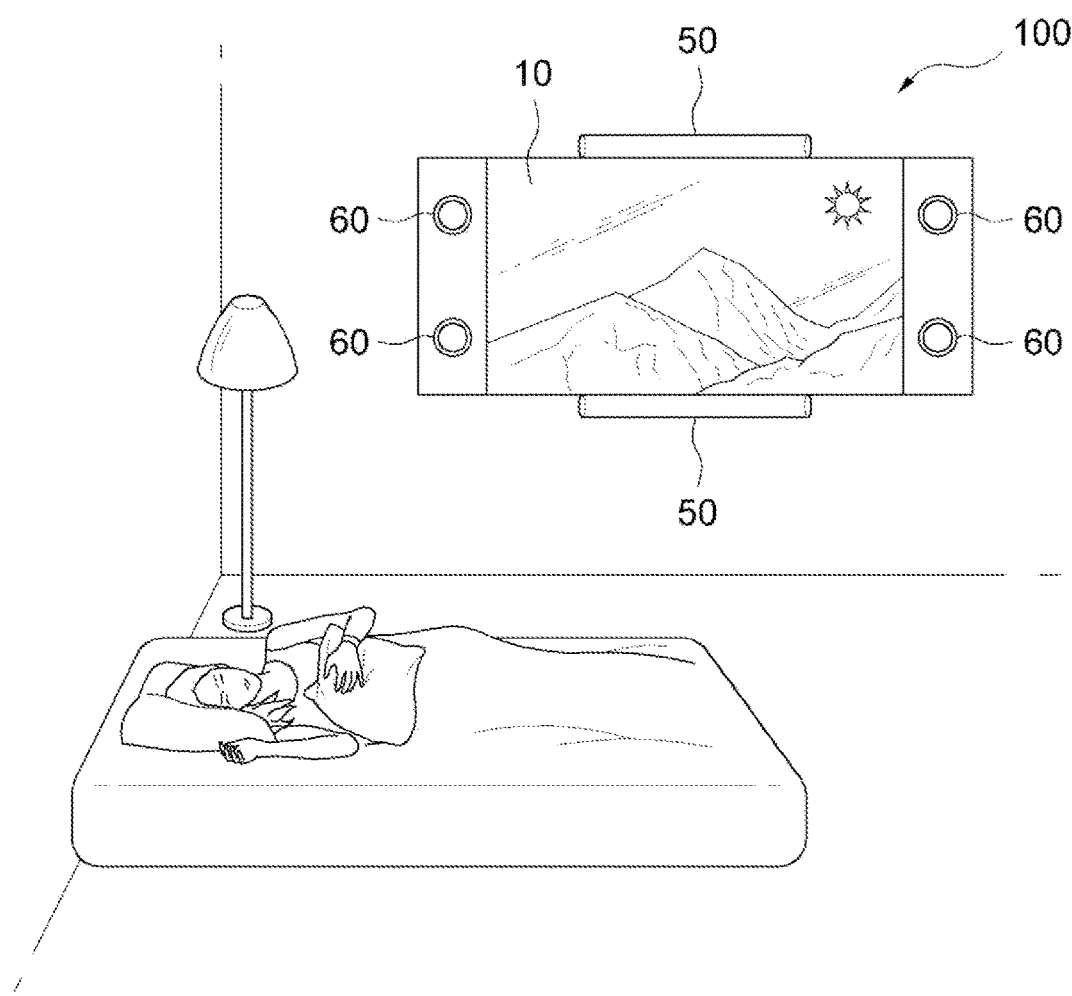
FIG. 1 shows a state in which a display device for replacing a window according to an embodiment of the present invention is used in a room.

Hereinafter, with reference to the accompanying drawings, embodiments of the present invention will be described in detail so that those skilled in the art can easily carry out the present invention. However, the present invention may be embodied in many different forms and is not limited to the embodiments described herein. And in order to clearly explain the present invention in the drawings, parts irrelevant to the description are omitted, and similar reference numerals are attached to similar parts throughout the specification.

Throughout the specification, when a certain component is said to "include", "have" or "comprise", it means that it may further include other components without excluding other components unless otherwise stated.

FIG. 1 is a view showing a state in which a display device for replacing a window or door according to an embodiment of the present invention is used. More particularly FIG. 1 is an example of a display device 100 for replacing windows according to the present invention installed on a wall in a room having no window. The external landscape is displayed on the display device 100. As a result, residents can enjoy the outside landscape while living in a house without windows. A ventilation unit 60 is further installed in the display device. Accordingly, since it is possible to proceed with ventilation from the side of the wall, the same effect as that of opening a window and ventilating can be obtained.

In addition, a UV lamp 50 may be installed in the display device for replacement of windows and doors according to an embodiment of the present invention. The UV lamp 50 operates when it is determined that there are no people in the house, and accordingly, it is possible to improve the indoor environment by sterilizing viruses or fungi present in the room.

Hereinafter, with reference to FIGS. 2 to 4, an example in which landscape information is changed according to the lapse of time, change in weather, etc. will be described.

Figure 2:
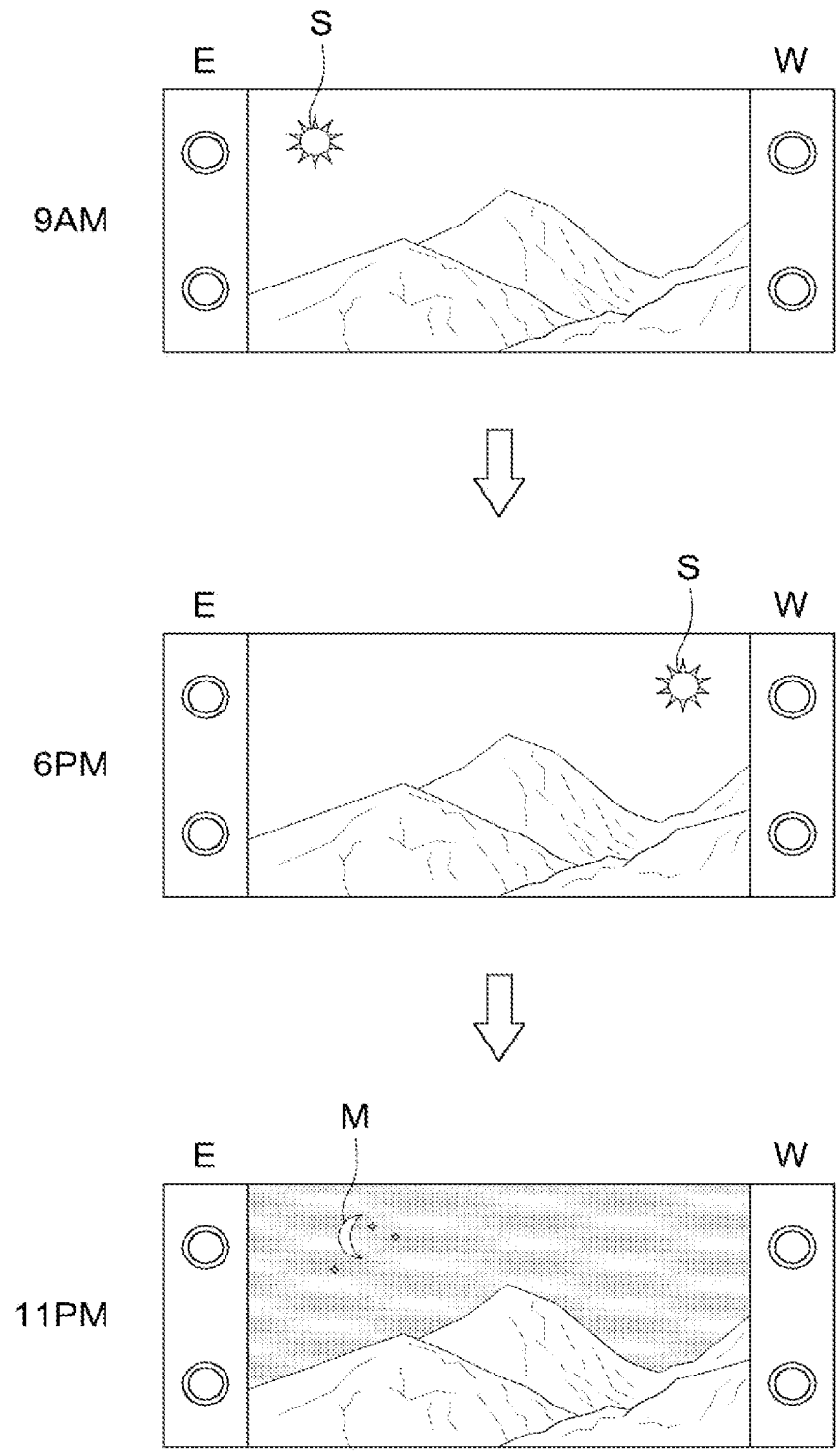
FIG. 2 is a view for explaining an operation of a display apparatus for replacing a window over time, according to an embodiment of the present invention.

FIG. 2 is a diagram for explaining how a display apparatus for replacing windows or doors according to an embodiment of the present invention operates as time passes. The first drawing shows the case of 9 o'clock in the morning. As shown, the sun rises in the east at 9 o'clock in the morning. The second drawing shows the case of 6 o'clock in the evening. As shown, the sun is floating in the west at 9 o'clock in the morning. And the third drawing is when it is 11 o'clock in the evening. At this time, the moon is floating in the sky. And the background color is changed to a dark color. In this way, by adjusting the position of the sun or the color and brightness of the display as time passes, the landscape information of the display can be changed in the same way as other landscape changes with lapses of time.

Figure 3:
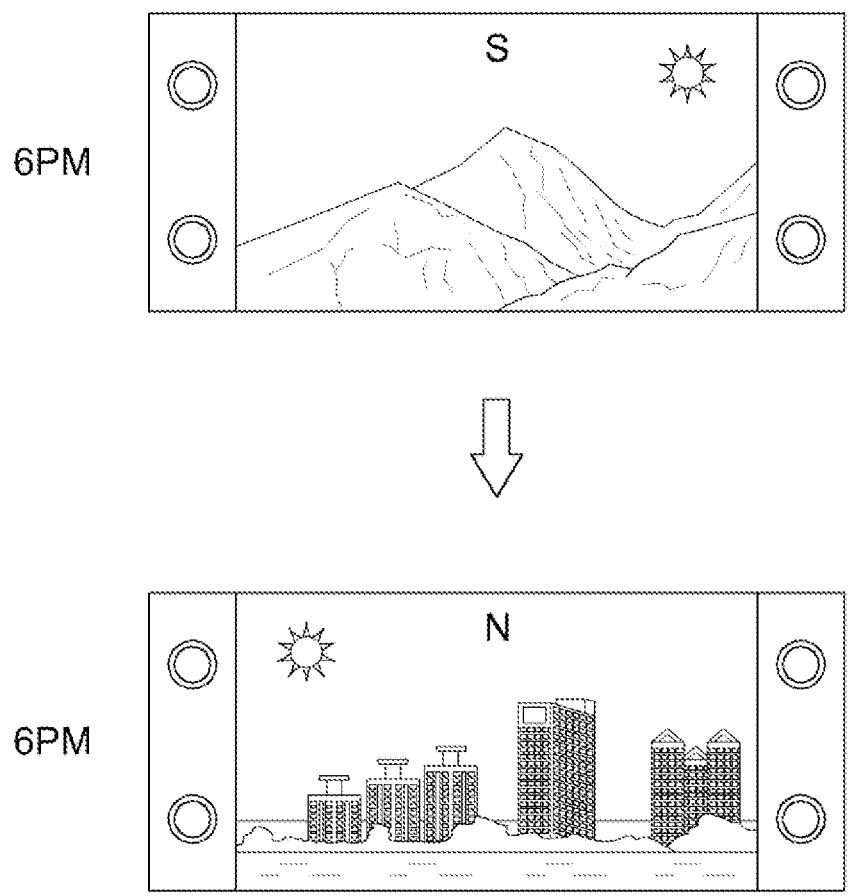
FIG. 3 shows a window replacement display changed according to a direction designated by a user, according to an embodiment of the present invention.

FIG. 3 is a view for explaining how the display device for window replacement, which is an embodiment of the present invention, operates according to a direction designated by a user. The first drawing of FIG. 3 is an example in which landscape information toward the south is displayed. The second drawing of FIG. 3 is an example in which landscape information toward the north is displayed. The display device for window replacement according to the present invention may include a GPS device (not shown) and a geomagnetic sensor (not shown). A GPS device acquires location information. The geomagnetic sensor acquires direction information. The control unit 80, which will be described later, may obtain landscape information suitable for location information and direction information from a communication device based on the location information and direction information. For example, when the display device for window replacement according to the present invention is installed in the north direction of the Empire State Building in New York, the landscape of Manhattan in the north direction seen from the Empire State Building is displayed on the display device for window replacement.

Figure 4:
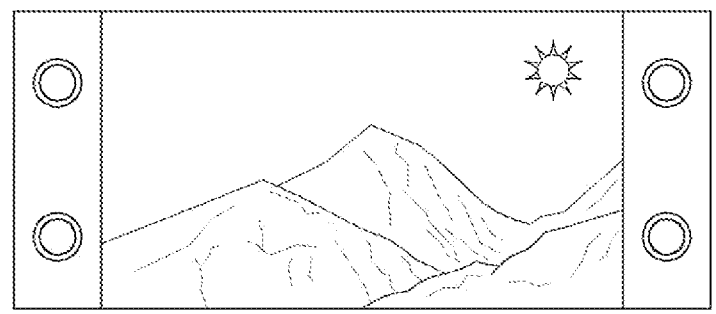
FIG. 4 is a view for explaining an operation of a display apparatus for replacing a window according to a change in weather, according to an embodiment of the present invention.
Figure 4:
Figure 4:
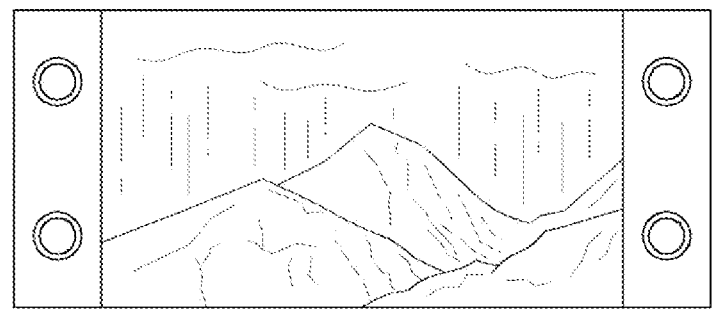

FIG. 4 is a view for explaining how the display device for window replacement, which is an embodiment of the present invention, operates according to weather changes. The first drawing of FIG. 4 shows a case in which the weather is clear. As shown, a clear blue background appears without a single cloud. The second drawing is when the weather is "rain". As shown, the background sky turns gray and rain is displayed. In addition, rain sound may be output through the speaker. In this case, the residents can feel the sound of rain as well as the landscape of rain through the window replacement display device. That is, residents can visually and aurally feel the external landscape.

Figure 5:
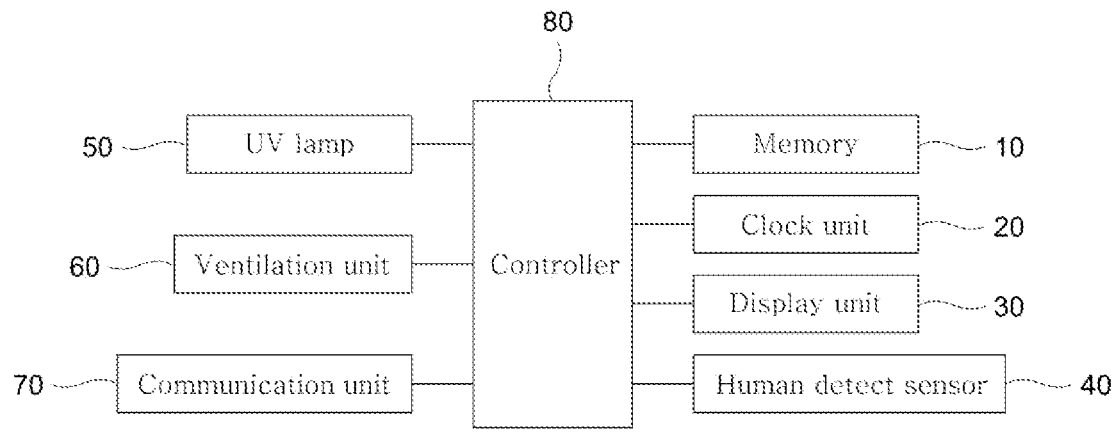
FIG. 5 is a block diagram illustrating an electronic configuration of a display apparatus for replacing a window according to an embodiment of the present invention.
Figure 5:
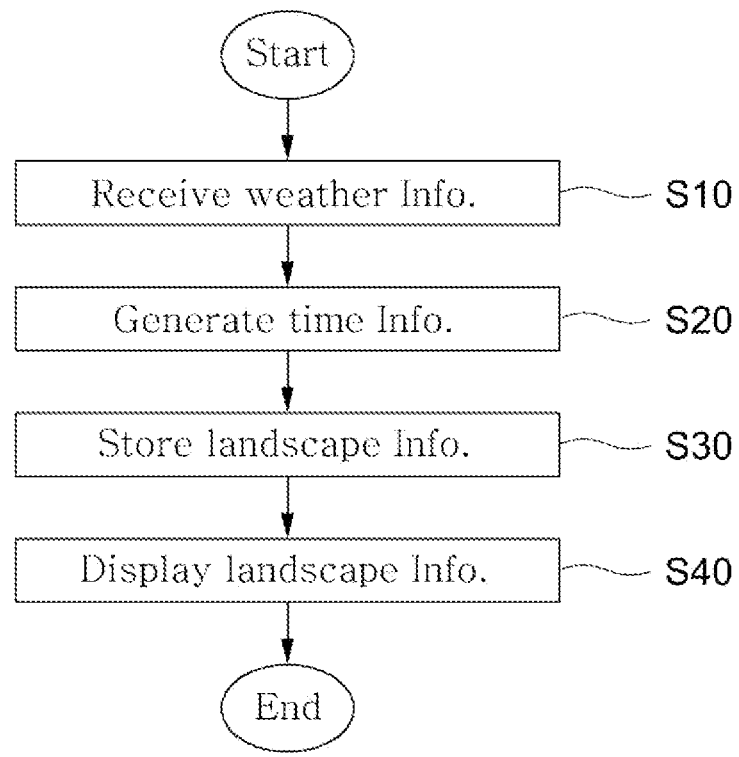

FIG. 5 is a block diagram illustrating an electronic configuration of a display device for window replacement according to an embodiment of the present invention. As shown in FIG. 5, the display device for window replacement according to the present invention is a memory 10, a clock unit 20, a display unit 30, a human detection sensor 40, a UV lamp 50, a ventilation unit 60, the communication unit 70 and the control unit 80 may be included.

The memory 10 device functions to store a program for driving the display device for window replacement according to the present invention, and information about landscape displayed on the display device for window replacement.

The clock unit 20 functions to generate current time information. The displayed landscape information as shown in FIG. 2 may be changed based on the current time information.

The display unit 30 is a component for displaying landscape information. Since the landscape information is displayed on the display unit 30, when installed on a wall, it may look like an actual window. The display unit 30 may be configured as a touch screen. If it is composed of a touch screen, it can be used like a real window. For example, a handler is displayed on one side of the display unit. When a touch-and-drag operation of moving the handler in one direction is performed, the ventilation unit 60 to be described later may be configured to operate as if a window is opened. And the intensity of the operation of the ventilation unit 60 may be changed according to the drag length.

Also, a curtain handler may be further displayed separately in the touch screen. When a touch-and-drag operation to the curtain handler is input, the brightness of the display unit 30 is controlled, so that an effect similar to using a curtain occurs.

The human detection sensor functions to check whether there is a person in the space (room or living room) in which the display device for replacing other windows according to the present invention is installed.

The UV lamp 50 functions as a sterilizing light to output ultraviolet rays. As mentioned earlier, in a room without windows, it is good for mold uniformity to grow. This deteriorates the living environment of people. Therefore, it is necessary to eliminate the fungus. In the present invention, when a person is not detected through the human body detection sensor 40, the display unit 30 is turned off and the UV lamp 50 is operated to improve the indoor air environment.

The ventilation unit 60 is installed like a speaker on both sides of the display unit 30 as described above. Ventilation information may be controlled according to weather information, may be controlled according to indoor environment information, or may be controlled according to a touch input. Since the ventilation unit 60 is installed on the wall rather than the ceiling, the air circulation effect is better. In addition, when operating together with a separate ventilation unit 60 attached to the ceiling, it is possible to enhance the air quality improvement.

The communication unit 70 is a component for acquiring weather information from an external device, for example, a smart phone or an external weather server. The landscape displayed on the display device is changed according to the weather information. The weather information includes sunrise information, sunset information, moonrise information, and moonset information, which is not acquired through the communication unit 70 but may be stored in the memory 10 itself.

As described above, the control unit 80 functions to display the landscape information on the display unit 30 by changing the landscape information according to the current time information. Also, the controller 80 may control the brightness of the display unit according to the current time information. In addition, the controller 80 changes and displays the landscape information based on the weather information according to the current time information, and when a person is not detected through the human body detection sensor 40, an operation of improving the indoor air environment may be performed by turning off the display unit 30 and turning on the UV lamp 50.

Hereinafter, an operation of the display device for window replacement according to an embodiment of the present invention will be described with reference to FIG. 6.

FIG. 6 is a flowchart for explaining the operation of the display device for window replacement according to an embodiment of the present invention. As shown in FIG. 6, first, the communication unit 70 obtains weather information (S10). Then, time information is acquired through the clock unit 20 (S20), and landscape information is already stored in the memory 10 (S30). The controller 80 uses the weather information and time information to change and display the landscape information (S40). By configuring in this way, the display device for replacing the window installed on the wall can provide landscape information to the occupant like an actual window.

The window replacement type display device and its control method described above cannot be limitedly applied to the configuration and method of the above-described embodiments, but the embodiments are all or part of each embodiment so that various modifications can be made. may be selectively combined.

What is claimed is that:

1. A window replacement display device comprising:
    a memory storing a landscape information;
    a clock unit that generates current time information;
    a display unit for displaying the landscape information, the display unit being a touchscreen, wherein a handler and a curtain handler being displayed in the touch screen;
    a communication unit for receiving a weather information and the landscape information;
    a ventilation unit installed at both sides of the display unit;
    a GPS unit for receiving a position information;
    a geomagnetic sensor for a direction information; and
    a control unit configured to acquire the landscape information via the communication unit based on the position information to store it in the memory, then to change the landscape information according to the current time information, to display it on the display unit in order to control the ventilation unit based on the weather information,
    wherein the control unit is configured to control the ventilation unit's operation according to a touch input of the handler, and the control unit is configured to control the brightness of display unit's operation according to the touch input of the curtain handler.

2. The window replacement display device of claim 1, wherein the weather information includes sunrise information, sunset information, moonrise information, and moonset information, and the control unit is configured to control the brightness of the display unit according to the current time information.

3. The window replacement display device of claim 1, wherein the weather information includes current weather information, and the control unit is configured to control to change and display the landscape information based on the weather information according to the current time information.

4. The window replacement display device of claim 1, further comprising:
    a human detection sensor,
    wherein the control unit is configured to turns off the display unit when a person is not detected through the human detection sensor.

5. The window replacement display device of claim 3, further comprising:
    a sterilizing light source;
    wherein the control unit is configured to turn on the sterilizing light source when a person is not detected through the human detection sensor, in order to improve the indoor atmospheric environment.

* * * * *